United States Patent
Benisty (10) Patent No.: US 11,829,615 B2
(45) Date of Patent: Nov. 28, 2023

(54) OUT OF ORDER DATA TRANSFER HINT CALIBRATION

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 101 days.

(21) Appl. No.: 17/673,537

(22) Filed: Feb. 16, 2022

(65) Prior Publication Data

US 2023/0259290 A1 Aug. 17, 2023

(51) Int. Cl.
*G06F 12/00* (2006.01)
*G06F 3/06* (2006.01)

(52) U.S. Cl.
CPC ............ *G06F 3/0629* (2013.01); *G06F 3/061* (2013.01); *G06F 3/0604* (2013.01); *G06F 3/0625* (2013.01); *G06F 3/0679* (2013.01)

(58) Field of Classification Search
CPC ...... G06F 3/0629; G06F 3/0604; G06F 3/061; G06F 3/0625; G06F 3/0679
See application file for complete search history.

(56) References Cited

U.S. PATENT DOCUMENTS

| | | | |
|---|---|---|---|
| 9,665,630 B1* | 5/2017 | Bigman | G06F 3/061 |
| 10,268,584 B2 | 4/2019 | Hahn | |
| 10,795,604 B2 | 10/2020 | Silbermintz et al. | |
| 10,884,920 B2 | 1/2021 | Benisty et al. | |
| 11,132,143 B2 | 9/2021 | Jang et al. | |
| 11,599,468 B1* | 3/2023 | Turner | G06F 12/0833 |
| 2008/0263259 A1* | 10/2008 | Sadovsky | G06F 3/0613 |
| | | | 711/E12.001 |
| 2016/0246726 A1* | 8/2016 | Hahn | G06F 3/0613 |
| 2019/0227796 A1* | 7/2019 | Beu | G06F 9/3016 |
| 2020/0057715 A1* | 2/2020 | Benisty | G06F 12/0246 |
| 2021/0216458 A1 | 7/2021 | Kang | |
| 2022/0229584 A1* | 7/2022 | Choi | G06F 3/0679 |
| 2023/0044866 A1* | 2/2023 | Benisty | G06F 3/0619 |

* cited by examiner

Primary Examiner — John A Lane
(74) Attorney, Agent, or Firm — PATTERSON + SHERIDAN, LLP; Steven H. VerSteeg (57) ABSTRACT

A data storage device includes a memory device and a controller coupled to the memory device. The controller is configured to determine that a hint calibration operation is needed, select a first hint mode out of a plurality of hint modes, generate one or more hints based on a selected hint mode, and select a hint mode based on one or more of a performance, quality of service, and power consumption of the data storage device. The controller is further configured to iterate through the plurality of hint modes during the hint calibration operation and operate based on the selected hint mode until the controller determines that another hint calibration operation is needed.

20 Claims, 5 Drawing Sheets

OUT OF ORDER DATA TRANSFER HINT CALIBRATION

BACKGROUND OF THE DISCLOSURE

Field of the Disclosure

Embodiments of the present disclosure generally relate to data storage devices, such as solid state drives (SSDs), and, more specifically, hint modes for Universal Flash Storage (UFS) data storage devices.

Description of the Related Art

UFS is an advanced, high performance interface designed for computing and mobile systems, such as smartphones and tablets, where power consumption needs to be minimal. The latest UFS interface protocols are optimized for efficient throughput, system performance, and reliability. When using UFS solutions, power consumption is reduced due to the near zero power consumption during an idle power state. Thus, when combined with the Mobile Industry Processor Interface (MIPI) power-saving specifications, the total amount of power consumption may be significantly reduced. UFS standards also adopt the well-known Small Computer System Interface (SCSI) Architecture Model and command protocols that support multiple simultaneous commands and command queuing features in order to enable highly efficient multi-thread programming.

In the UFS protocol, an out of order (OOO) feature describes a mechanism to transfer data in an OOO manner, where the data storage device provides a hint to a host device for the next data transfer. The host device may use the provided hint to fetch a physical region descriptor table (PRDT) entry before the next data is transferred. The standard defines the hints that the data storage device provides to the host device before issuing the OOO data transfer. The host controller may use the hint size in order to fetch and cache internally multiple PRDT entries. Since host device PRDT cache may be limited, a new attribute may be needed in order to limit the number of outstanding hints that the data storage device may provide.

Thus, there is a need in the art for an improved hint mode calibration in order to maximize overall system performance.

SUMMARY OF THE DISCLOSURE

The present disclosure generally relates to data storage devices, such as solid state drives (SSDs), and, more specifically, hint modes for Universal Flash Storage (UFS) data storage devices. A data storage device includes a memory device and a controller coupled to the memory device. The controller is configured to determine that a hint calibration operation is needed, select a first hint mode out of a plurality of hint modes, generate one or more hints based on a selected hint mode, and select a hint mode based on one or more of a performance, quality of service, and power consumption of the data storage device. The controller is further configured to iterate through the plurality of hint modes during the hint calibration operation and operate based on the selected hint mode until the controller determines that another hint calibration operation is needed.

In one embodiment, a data storage device includes a memory device and a controller coupled to the memory device. The controller is configured to determine that a hint calibration operation is needed, select a first hint mode out of a plurality of hint modes, generate one or more hints based on a selected hint mode, and select a hint mode based on one or more of a performance, quality of service, and power consumption of the data storage device.

In another embodiment, a data storage device includes a memory device and a controller coupled to the memory device. The controller includes a hint generator unit configured to generate one or more hints based on a selected hint mode, where the selected hint mode is one of a plurality of hint modes, and a hint calibration unit coupled to the hint generator unit, wherein the hint calibration unit is configured to select the selected hint mode, where the selected hint mode is based on one or more of a performance, quality of service, and power consumption of the data storage device.

In another embodiment, a data storage device includes memory means and a controller coupled to the memory means. The controller is configured to iterate through a plurality of hint modes, where iterating includes generating one or more hints based on a selected hint mode and measuring a performance, quality of service, and power consumption of the selected hint mode in parallel with generating the one or more hints, and operate the data storage device based on the selected hint mode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, hint modes for Universal Flash Storage (UFS) data storage devices. A data storage device includes a memory device and a controller coupled to the memory device. The controller is configured to determine that a hint calibration operation is needed, select a first hint mode out of a plurality of hint modes, generate one or more hints based on a selected hint mode, and select a hint mode based on one or more of a performance, quality of service, and power consumption of the data storage device. The controller is further configured to iterate through the plurality of hint modes during the hint calibration operation and operate based on the selected hint mode until the controller determines that another hint calibration operation is needed.

Figure 1:
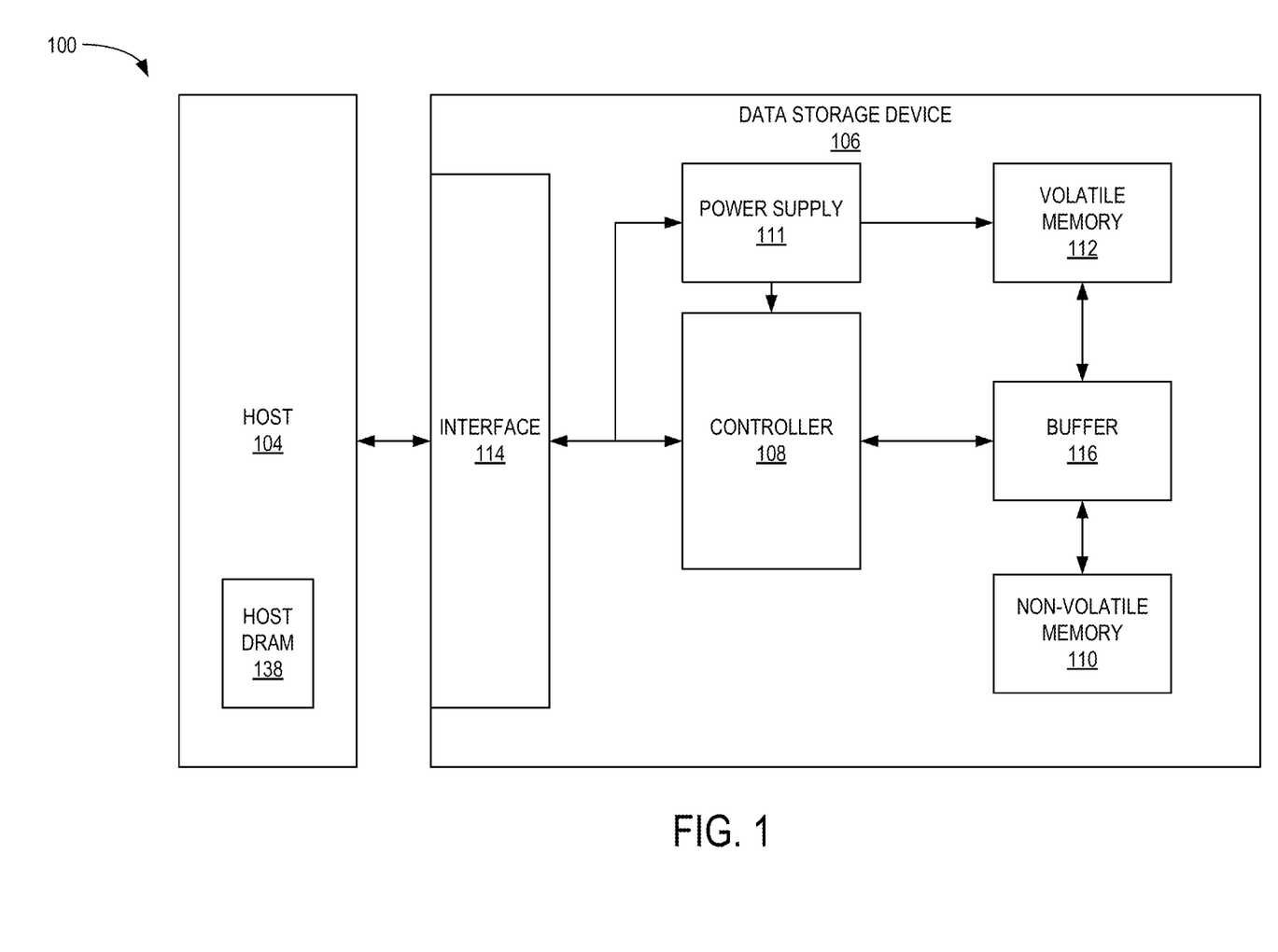
FIG. 1 is a schematic block diagram illustrating a storage system having a data storage device that may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
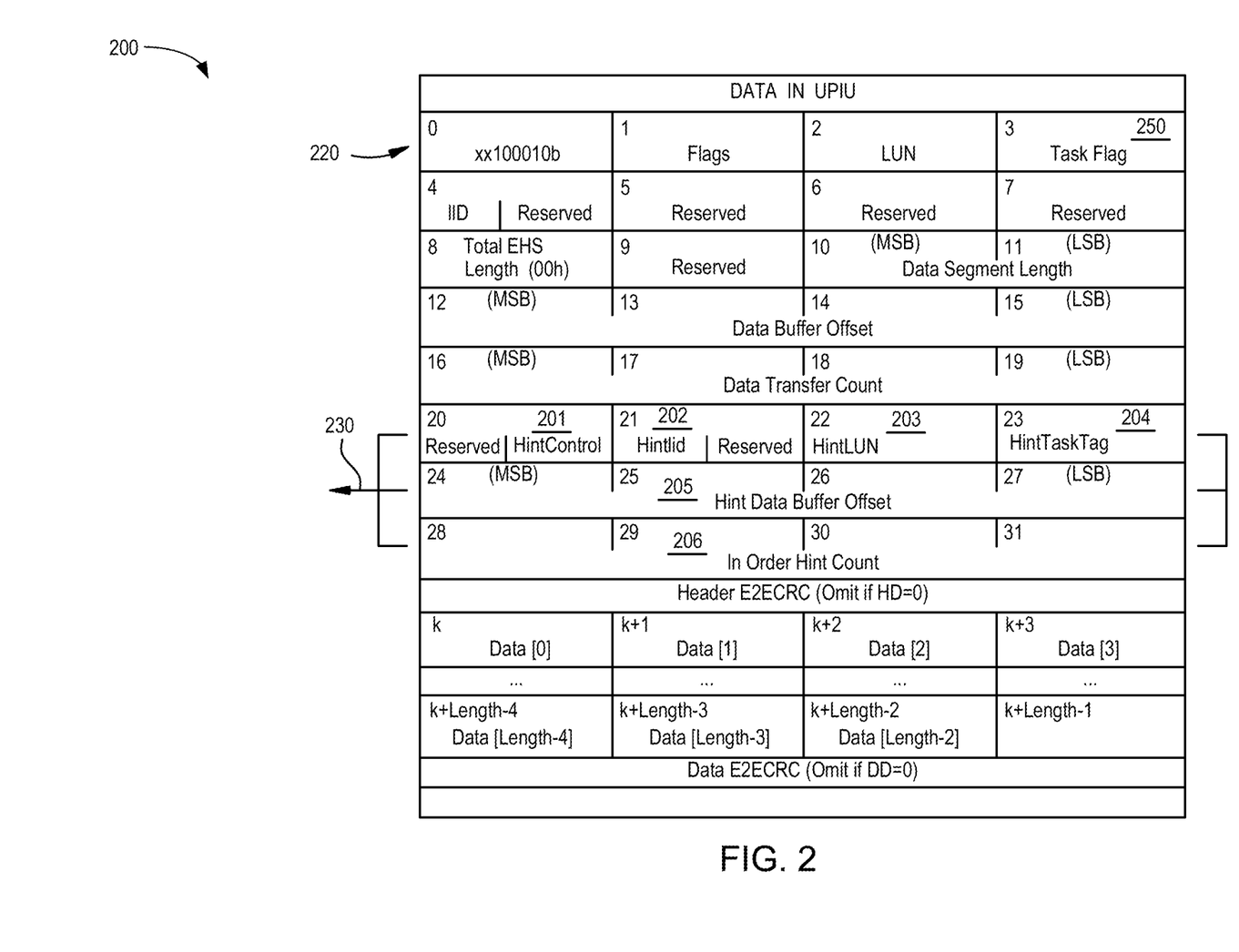
FIG. 2 is an illustration of a UFS packet, according to certain embodiments.

FIG. 2 is an illustration of a UFS packet 200, according to certain embodiments. The UFS packet 200 includes a plurality of fields 220, which includes hint fields 230. Each of the plurality of fields 220 is associated with one or more bit values. The hint fields 230 add support for out of order (OOO) data transfer functionality. The hint fields 230 include a HintControl 201 located in field 20, a HintIID (Hint independent and identically distributed random variable) 202 located in field 21, a HintLUN (Hint Linear Unit number) 203 located in field 22, a HintTaskTag 204 located in field 23, a Hint Data Buffer Offset 205 located in fields 24-27, and an In Order Hint Count 206 located in fields 28-31.

The HintControl 201 indicates the validity of the hint fields 230. When the HintControl 201 is set to "0b," the hint fields 230 are not valid and are expected to be ignored by a controller of a host device, such as the host device 104 of FIG. 1. However, when the HintControl 201 is set to "1b," the hint fields 230 are valid. When the hint fields 230 are not valid, are disabled (e.g., bDataOrdering=00h or bOutOfOrderDataEn=00h), or when the hint fields 230 (e.g., HintTaskTag 204, etc.) do not refer to a READ (6), a READ (10), a READ (16), or HPB Read command that request a read of specific logical blocks and transfer of the data to a buffer, the HintControl 201 is set to 0x0 and the hint information is not provided.

HintIID 202 may include a signifier which indicates the field location. Furthermore, HintIID 202 indicates the IID of data in the UFS Protocol information Units (UPIUs) to be transferred by a controller, such as the controller 108 of FIG. 1, to the host device 104. The HintIID 202 field is valid when the HintControl 201 is set to "1b." The HintIID 202 field may be different than IID field.

HintLUN 203 is a field which indicates the LUN of data in the UPIUs that a controller, such as the controller 108 of FIG. 1, will transfer. HintLUN 203 is valid when HintControl 201 is set to "1b." The HintLUN 203 field may be different than the LUN field.

HintTaskTag 204 is a field which indicates the Task Tag of data in the UPIUs. The HintTaskTag 204 field may be different than a TaskTag 250 field located in bit3. The Hint Data Buffer Offset 205 is the field that indicates the Data Buffer Offset in a data in UPIUs that the data storage device 106 will transfer. The HintTaskTag 204 field is valid when HintControl 201 is set to "1b."

In Order Hint Count 206 is a field which indicates the number of 4 KBs that the host device 104 is expected to transfer in order to the initiator starting from the Hint Data Buffer Offset 205. The data storage device 106 may interleave data in UPIUs pertaining to all hints provided by the data storage device 106. The In Order Hint Count 206 is valid when HintControl 201 is set to "1b."

Figure 3:
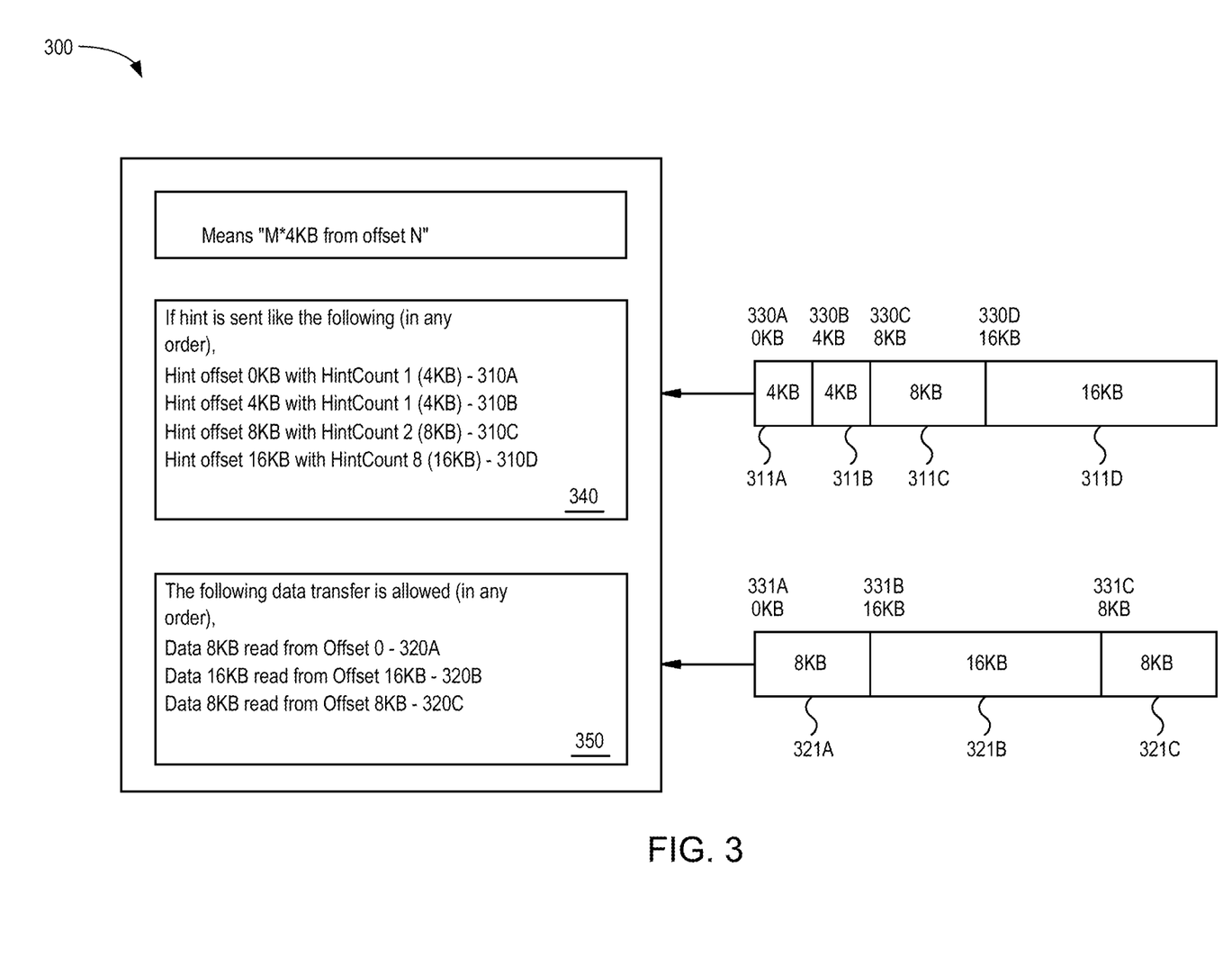
FIG. 3 is a schematic illustration of an example of the out of order (OOO) transfer using the generated hints, according to certain embodiments.

FIG. 3 is a schematic illustration of an example 300 of an out of order (OOO) data transfer using the generated hints, according to certain embodiments. The transfer size of Command hints 340 in this example is 32 KB. Command hints 340 may be referred to as Command 340 for simplification purposes herein. A data storage device, such as the data storage device 106 of FIG. 1, provides hints to a host device, such as the host device 104 of FIG. 1. In this example, there are four hints (i.e., 310A, 310B, 310C, and 310D). Each hint (i.e., 310A, 310B, 310C, and 310D) defines the order of the data within the chunk of data. Command 340 includes the hints issued to the host device 104.

Each of the hints issued includes two components. These two components include a hint offset 330A, 330B, 330C, 330D, such as the Hint Data Buffer Offset 205 of FIG. 2, and a hint count 311A, 311B, 311C, 311D, such as the In Order Hint Count 206 of FIG. 2. The hint count represents the size of the data transfer. For example, a hint count of a unit size of 1 may be substantially equal to about 4 KB. In the currently depicted embodiment, the first hint 310A includes a hint offset 330A of zero and a hint count 311A of 1 (4 KB). The second hint 310B includes a hint offset 330B of 4 and a hint count 311B of 1 (4 KB). The third hint 310C includes a hint offset 330C of 8 and a hint count 311C of 2 (8 KB).

The fourth hint 310D includes a hint offset 330D of 16 and a hint count 311D of 8 (16 KB). Command 340 is able to provide the hints issued 310 to the controller, such as the controller 108 of FIG. 1, in any order.

The data transfer 350 may include transferred data in any order based on the hints issued 310. One embodiment of the data transfer 350 is shown. Each transferred data includes two components. These two components include an offset 331A, 331B, and 331C and a count 321A, 321B, and 321C. In the embodiment shown, it can be seen that the first transferred data 320A includes a count 321A of 8 KB and an offset 331A of zero. The first transferred data 320A combines the first two hints, 310A and 310B, from command 340 together. The second transferred data 320B includes a count 321B 16 KB and an offset 331B of 16 KB, which represents the fourth hint 310D of command 340. The last transferred data 320C includes a count 321C and an offset 331C of 8 KB, which represents the third hint 310C of command 340. The previously listed order of transferred data is not intended to be limiting, but to provide an example of a possible embodiment. Thus, the embodiments described are not intended to be restricting in any order.

Figure 4:
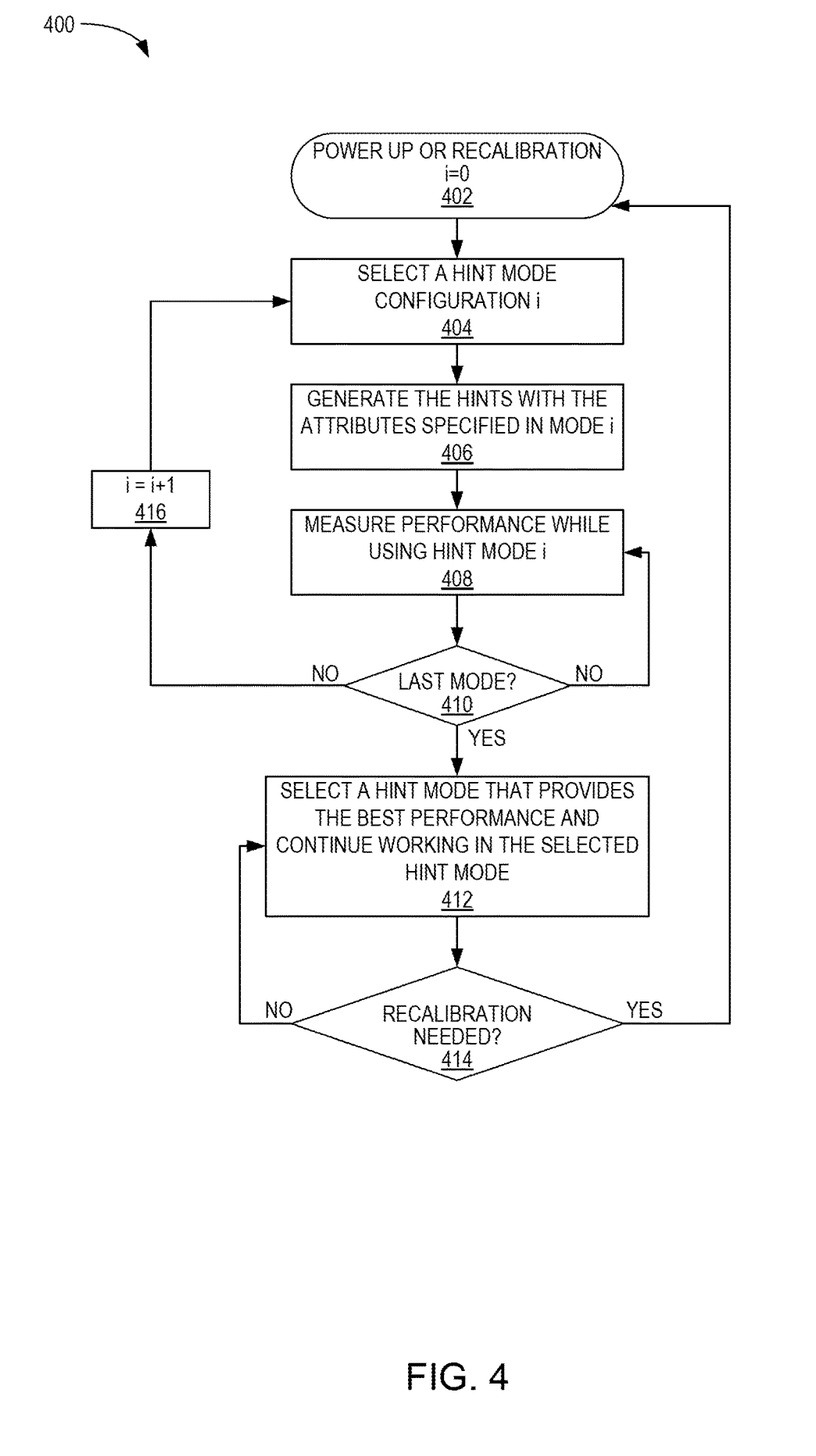
FIG. 4 is a flow diagram illustrating a method of selecting a hint mode during a hint mode calibration operation, according to certain embodiments.

FIG. 4 is a flow diagram illustrating a method 400 of selecting a hint mode during a hint mode calibration operation, according to certain embodiments. Method 400 may be implemented by a controller, such as the controller 108 of FIG. 1. Furthermore, aspects of the storage system 100 of FIG. 1 may be referenced herein for exemplary purposes. It is to be understood that although aspects of the storage system 100 may be referenced herein, the embodiments described may be applicable to other storage systems and is not limited to the storage system 100.

At block 402, method 400 begins when the data storage device 106 powers up (e.g., wakes up from an idle power state or returns to full power from being shutdown) or when a hint mode recalibration operation indication is acknowledged or recognized. In one example, the hint mode recalibration operation indication may be generated by the controller 108 due to increased latency, timeout, and/or decreased performance of the UFS interface due to the current hint mode or sent to the controller 108 by the host device 104 due to increased latency, timeout, and/or decreased performance due to the current hint mode. Furthermore, at block 402, the controller 108 sets i equal to 0, where i represents a number of hint modes iterated through. For example, the controller 108 may have a database storing several configuration modes, where each configuration mode is associated with a hint mode, to be used during the hint mode calibration operation. The database may be stored in the NVM 110 or, in some examples, a host memory buffer (HMB) of the host DRAM 138. In other examples, the database may be cached in the volatile memory 112. In another example, the database may be stored in DRAM of the controller 108.

At block 404, the controller 108 selects a hint mode configuration associated with i. When the hint mode calibration operation begins, the controller 108 may choose a first hint mode configuration from the database. When i is not equal to 0, the controller 108 selects another hint mode configuration that is associated with the current value of i. At block 406, the controller 108 generates hints with the attributes specified in the selected hint mode, where the selected hint mode corresponds to the value of i. For example, the hints may be generated by a hint generator unit disposed in an interface, such as a PCIe interface, of the controller 108. At block 408, the controller 108 measures the performance while using the selected hint mode corresponding to the value of i. For example, the performance may be measured by a hint calibration unit disposed in an interface, such as a PCIe interface, of the controller 108. The controller 108 may measure the performance and generate hints may be performed in parallel. The performance may be measured and captured in Table 1 below, where A, B, C, . . . , and N corresponds to a measured performance for the corresponding hint mode. It is to be understood that the columns listed in Table 1 may not be an all-encompassing list, and other columns, including less or more, may be applicable to the embodiments described herein.

TABLE 1

| Hint Mode | Outstanding Hints | Hint to Data-Transfer | Hint Chunk Size | . . . | Measured Performance |
|---|---|---|---|---|---|
| 0 | 4 | 1 μsec | 16 KB | | A |
| 1 | 4 | 10 μsec | 16 KB | | B |
| 2 | 16 | 5 | 8 KB | | C |
| . . . | . . . | . . . | . . . | | . . . |
| n | 64 | 10 μsec | 4 KB | | N |

Referring to Table 1, hint mode corresponds to a hint mode of the plurality of hint modes, the outstanding hints corresponds to the number of outstanding hints to be sent, the hint to data-transfer corresponds to the time to transfer a hint, the hint chunk size corresponds to the size of the hint to be sent to the host device 104, and the measured performance corresponds to the performance of the data storage device using a respective hint mode.

At block 410, the controller 108 determines if the selected is the last hint mode to be used and measured in the hint mode calibration operation. For example, if the database includes 26 hint mode configurations, then the hint mode calibration operation iterates through the 26 hint modes by generating hints for each of the 26 hint modes and measuring the performance of each of the 26 hint modes. If the current hint mode selected is not the last hint mode at block 410, then method 400 either returns to block 408, where the performance while using the current hint mode selected is used, or the controller 108 iterates i, such that i equals i+1, at block 416. For example, the controller 108 may determine that the number of data points relating to the measured performance of the current hint mode selected is under a threshold value, where the threshold value corresponds to a minimum number of data points acceptable to provide an accurate measured performance for the current hint mode selected.

However, if the current hint mode selected is the last hint mode at block 410, then the controller 108 selects a hint mode that provides the best performance and continues to work in the selected hint mode at 412. For example, the controller 108 may parse Table 1 for the hint mode with the best performance. It is to be understood that the phrase "best performance" is not intended to be limiting, but to provide an example of a possible embodiment. For example, the controller 108 may select a hint mode to use based on a weighted selection of at least one of the columns of Table 1. Furthermore, the hint mode may be selected in such a way that optimizes or is a trade-off between overall performance, quality of service (QoS) requirements, and power consumption of the data storage device 106. In one example, the hint mode selected may be based on a threshold performance requirement.

In some examples, the controller 108 may select a hint mode based on a workload type. For example, there may be a benefit in using a first hint mode for first workload and a second hint mode for a second workload. The workloads may include random read workload, random write workload, sequential read workload, sequential write workload, and mixed workload.

In other examples, the controller 108 may determine that the hint mode calibration operation may determine that a hint mode configuration is acceptable to be used prior to iterating through each of the plurality of hint mode configurations. Thus, the controller 108 may determine to end the hint mode calibration operation prematurely and use the hint mode configuration that is acceptable. Furthermore, the last hint mode used prior to a power cycle and/or recalibration request may be stored in the NVM 110. Thus, the controller 108 may use the last hint mode when starting the hint mode calibration operation rather than a first hint mode.

At block 414, the controller 108 determines if a recalibration is needed. A recalibration may be needed due to the data storage device 106 powering up (e.g., wakes up from an idle power state or returns to full power from being shutdown) or when a hint mode recalibration operation indication is acknowledged or recognized. In one example, the hint mode recalibration operation indication may be generated by the controller 108 due to increased latency, timeout, and/or decreased performance of the UFS interface due to the current hint mode or sent to the controller 108 by the host device 104 due to increased latency, timeout, and/or decreased performance due to the current hint mode. If a recalibration is not needed at block 414, then method 400 returns to block 412. However, if a recalibration is needed at block 414, then method 400 returns to block 402.

Figure 5:
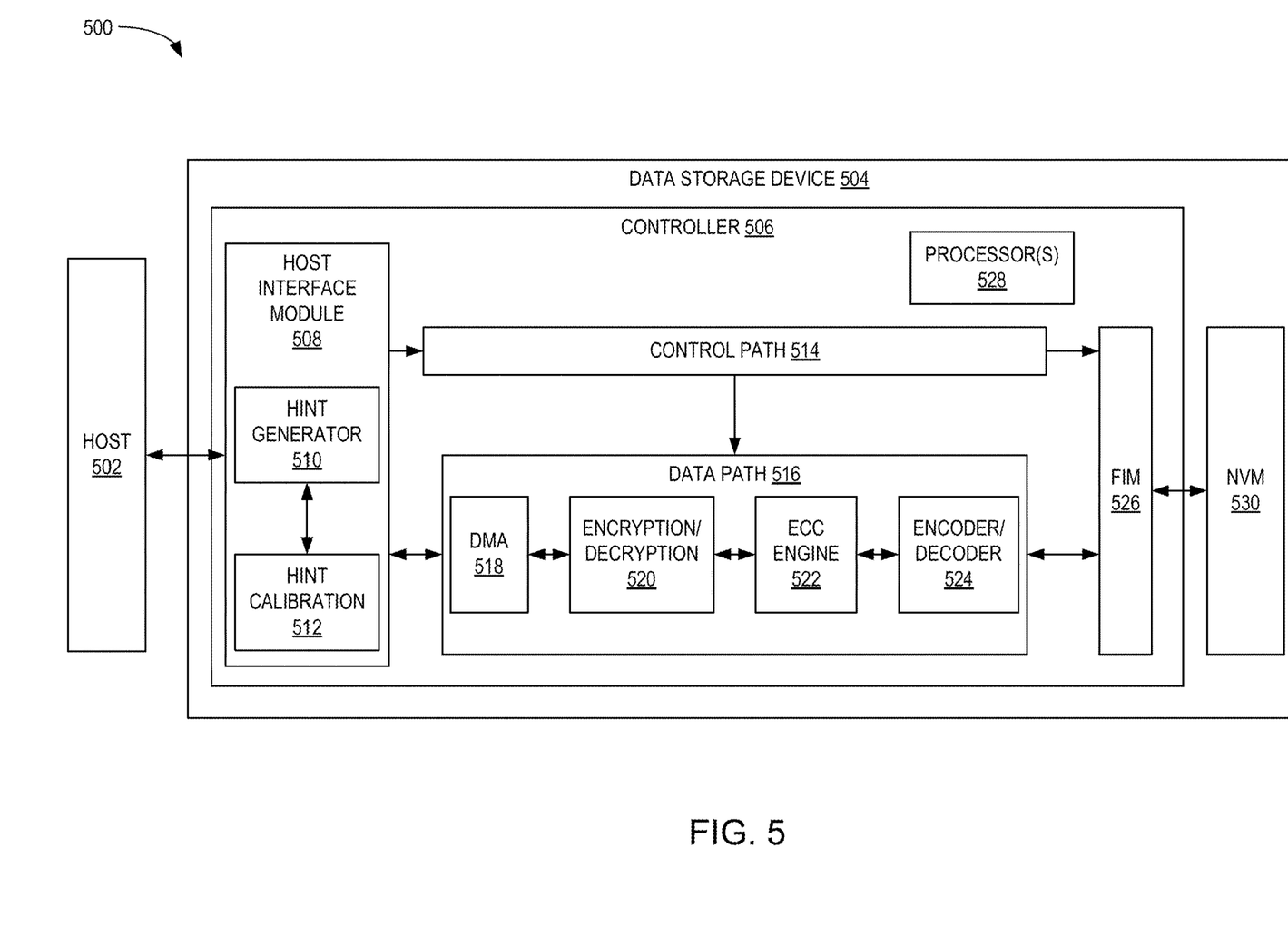
FIG. 5 is a schematic block diagram illustrating a storage system having a data storage device that may function as a storage device for a host device, according to certain embodiments.

FIG. 5 is a schematic block diagram illustrating a storage system 500 having a data storage device 504 that may function as a storage device for a host device 502, according to certain embodiments. Aspects of the storage system 100 of FIG. 1 may be similar to the storage system 500. The host device 502 is coupled to the data storage device 504, such that communication between the host device 502 and the data storage device 504 may occur. Communication may include the transferring of commands, messages, data, and the like between the host device 502 and the data storage device 504.

The data storage device 504 includes a controller 506 and an NVM 530. The controller 506 includes a host interface module (HIM) 508, a control path 514, a data path 516, a flash interface module (FIM) 526, and one or more processor(s) 528. It is to be understood that the data storage device 504 may include additional components not shown for simplification purposes. The one or more processor(s) 528 may be used to provide computing resources for the controller 506. The HIM 508 includes a hint generator unit 510 and a hint calibration unit 512. The hint calibration unit 512 may be configured to execute method 400 of FIG. 4, where the hint generator unit 510 generates the hints based on the selected hint mode configuration, such as at block 406 and block 412 of FIG. 4. The HIM 508 is coupled to the host device 502, the control path 514, and the data path 516.

The control path 514 may be configured to process received commands and pass the processed commands to the data path 516 and the FIM 526. The data path 516 includes a direct memory access (DMA) module 518, an encryption/decryption unit 520, an error correction code (ECC) engine 522, and an encoder/decoder unit 524. It is to be understood that the encryption/decryption unit 520 and the encoder/decoder unit 524 may each be separate units and is shown as one for simplification purposes. Data is received by the HIM 508 and transferred to the data path 516. The DMA 518 may be configured to access the volatile memory of the controller 506. The encryption/decryption unit 520 may be configured to encrypt the data received from the host device 502 and decrypt the encrypted data received from the NVM 530 to send back to the host device 502. The ECC engine 522 may be configured to generate ECC data for the data as well as correct bit errors using the generated ECC data. The encoder/decoder unit 524 may be configured to encode the data received from the host device 502 and decode the data being transferred to the host device 502 from the NVM 530. The data path 516 and the control path 514 is coupled to the FIM 526, where the FIM 526 schedules read commands and write commands to the NVM 530, where the NVM 530 stores data.

By calibrating the data storage device using a plurality of hint mode configurations, performance of the data storage device when transferring OOO data may be improved.

In one embodiment, a data storage device includes a memory device and a controller coupled to the memory device. The controller is configured to determine that a hint calibration operation is needed, select a first hint mode out of a plurality of hint modes, generate one or more hints based on a selected hint mode, and select a hint mode based on one or more of a performance, quality of service, and power consumption of the data storage device.

The controller is further configured to maintain the plurality of hint modes in a database. The controller is further configured to iterate through the plurality of hint modes during the hint calibration operation. The controller is further configured to select the hint mode based on performance after iterating through the plurality of hint modes. The controller is further configured to operate based on the selected hint mode until the controller determines that another hint calibration operation is needed. Upon determining that the another hint calibration operation is needed, the controller is further configured to select the first hint mode out of the plurality of hint modes, generate the one or more hints based on a selected hint mode, and select a hint mode based on one or more of a performance, quality of service, and power consumption of the data storage device. Determining that the hint calibration operation is needed includes determining that a power cycle has occurred. Determining that the hint calibration operation is needed includes determining that a timeout has occurred. Determining that the hint calibration operation is needed includes detecting that a performance of the data storage device is not optimized. The controller is configured to measure a performance, quality of service, and power consumption of the data storage device in parallel to generating one or more hints based on the selected hint mode.

In another embodiment, a data storage device includes a memory device and a controller coupled to the memory device. The controller includes a hint generator unit configured to generate one or more hints based on a selected hint mode, where the selected hint mode is one of a plurality of hint modes, and a hint calibration unit coupled to the hint generator unit, wherein the hint calibration unit is configured to select the selected hint mode, where the selected hint mode is based on one or more of a performance, quality of service, and power consumption of the data storage device.

Each hint mode of the plurality of hint modes has a number of outstanding hints, a hint-to-data-transfer latency, and a hint chunk size. the number of outstanding hints is a number of hints that is sent to a host device in advance. The hint calibration unit is further configured to select another hint mode of the plurality of hint modes and provide the another hint mode to the hint generator unit. The hint generator unit is further configured to generate another one or more hints based on the another hint mode. The hint calibration unit is configured to select the selected hint mode is based on a workload type. The workload type is selected from group consisting of a random read workload, a random write workload, a sequential read workload, a sequential write workload, and mixed workload. The selected hint mode is a last hint mode used prior to a hint calibration operation. The performance is a threshold performance. The controller is configured to use the selected hint mode when a measured performance of the selected hint mode is greater than or equal to the threshold performance.

In another embodiment, a data storage device includes memory means and a controller coupled to the memory means. The controller is configured to iterate through a plurality of hint modes, where iterating includes generating one or more hints based on a selected hint mode and measuring a performance, quality of service, and power consumption of the selected hint mode in parallel with generating the one or more hints, and operate the data storage device based on the selected hint mode.

The controller is further configured to store a configuration for each of the plurality of hint modes. The controller is configured to select a hint mode based on a mixture of a measured performance, quality of service, and power consumption for each of the plurality of hint modes.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      determine that a hint calibration operation is needed;
      select a first hint mode out of a plurality of hint modes;
      generate one or more hints based on a selected hint mode; and
      select a hint mode based on one or more of a performance, quality of service, and power consumption of the data storage device.

2. The data storage device of claim 1, wherein the controller is further configured to maintain the plurality of hint modes in a database.

3. The data storage device of claim 1, wherein the controller is further configured to iterate through the plurality of hint modes during the hint calibration operation.

4. The data storage device of claim 3, wherein the controller is further configured to select the hint mode based on performance after iterating through the plurality of hint modes.

5. The data storage device of claim 1, wherein the controller is further configured to operate based on the selected hint mode until the controller determines that another hint calibration operation is needed.

6. The data storage device of claim 5, wherein, upon determining that the another hint calibration operation is needed, the controller is further configured to:
   select the first hint mode out of the plurality of hint modes;
   generate the one or more hints based on a selected hint mode; and
   select a hint mode based on one or more of a performance, quality of service, and power consumption of the data storage device.

7. The data storage device of claim 1, wherein determining that the hint calibration operation is needed comprises determining that a power cycle has occurred.

8. The data storage device of claim 1, wherein determining that the hint calibration operation is needed comprises determining that a timeout has occurred.

9. The data storage device of claim 1, wherein determining that the hint calibration operation is needed comprises detecting that a performance of the data storage device is not optimized.

10. The data storage device of claim 1, wherein the controller is configured to measure a performance, quality of service, and power consumption of the data storage device in parallel to generating one or more hints based on the selected hint mode.

11. A data storage device, comprising:
    a memory device; and
    a controller coupled to the memory device, wherein the controller comprises:
       a hint generator unit configured to generate one or more hints based on a selected hint mode, wherein the selected hint mode is one of a plurality of hint modes; and
       a hint calibration unit coupled to the hint generator unit, wherein the hint calibration unit is configured to select the selected hint mode, wherein the selected hint mode is based on one or more of a performance, quality of service, and power consumption of the data storage device.

12. The data storage device of claim 11, wherein each hint mode of the plurality of hint modes has a number of outstanding hints, a hint-to-data-transfer latency, and a hint chunk size.

13. The data storage device of claim 12, wherein the number of outstanding hints is a number of hints that is sent to a host device in advance.

14. The data storage device of claim 11, wherein the hint calibration unit is further configured to:
    select another hint mode of the plurality of hint modes; and
    provide the another hint mode to the hint generator unit, and wherein the hint generator unit is further configured to generate another one or more hints based on the another hint mode.

15. The data storage device of claim 11, wherein the hint calibration unit is configured to select the selected hint mode is based on a workload type, and wherein the workload type is selected from group consisting of a random read workload, a random write workload, a sequential read workload, a sequential write workload, and mixed workload.

16. The data storage device of claim 11, wherein the selected hint mode is a last hint mode used prior to a hint calibration operation.

17. The data storage device of claim 11, wherein the performance is a threshold performance, and wherein the controller is configured to use the selected hint mode when a measured performance of the selected hint mode is greater than or equal to the threshold performance.

18. A data storage device, comprising:
    memory means; and
    a controller coupled to the memory means, wherein the controller is configured to:
       iterate through a plurality of hint modes, wherein iterating comprises:
          generating one or more hints based on a selected hint mode; and measuring a performance, quality of service, and power consumption of the selected hint mode in parallel with generating the one or more hints; and operate the data storage device based on the selected hint mode.

19. The data storage device of claim 18, wherein the controller is further configured to store a configuration for each of the plurality of hint modes.

20. The data storage device of claim 18, wherein the controller is configured to select a hint mode based on a mixture of a measured performance, quality of service, and power consumption for each of the plurality of hint modes.

* * * * *